United States Patent
Bravo et al.

(10) Patent No.: US 11,842,733 B2
(45) Date of Patent: Dec. 12, 2023

(54) ARTIFICIAL INTELLIGENCE SYSTEM FOR TASKS

(71) Applicant: KYNDRYL, INC., New York, NY (US)

(72) Inventors: Cesar Augusto Rodriguez Bravo, Alajuela (CR); David Alonso Campos Batista, Aurora (CR); Romelia H. Flores, Keller, TX (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 233 days.

(21) Appl. No.: 17/336,551

(22) Filed: Jun. 2, 2021

(65) Prior Publication Data

US 2022/0392444 A1 Dec. 8, 2022

(51) Int. Cl.
| | | |
|---|---|---|
| G10L 15/00 | (2013.01) | |
| G10L 15/22 | (2006.01) | |
| G10L 15/26 | (2006.01) | |
| G06N 5/04 | (2023.01) | |
| H04L 67/133 | (2022.01) | |

(52) U.S. Cl.
CPC ............ *G10L 15/22* (2013.01); *G06N 5/04* (2013.01); *G10L 15/26* (2013.01); *H04L 67/133* (2022.05); *G10L 2015/223* (2013.01)

(58) Field of Classification Search
CPC .......... G10L 15/22; G10L 15/16; G06F 3/167
See application file for complete search history.

(56) References Cited

U.S. PATENT DOCUMENTS

| | | |
|---|---|---|
| 6,668,055 B2 | 12/2003 | Marwell |
| 7,548,895 B2 | 6/2009 | Pulsipher |
| 7,676,221 B2 | 3/2010 | Roundtree |
| 9,368,114 B2* | 6/2016 | Larson .................. G06F 3/165 |
| 10,296,587 B2 | 5/2019 | Heck |
| 10,489,750 B2 | 11/2019 | Isherwood |
| 10,496,753 B2 | 12/2019 | Gruber |
| 10,679,013 B2 | 6/2020 | Raanani |
| 10,714,084 B2 | 7/2020 | Engles |
| 11,604,952 B2* | 3/2023 | Kim ...................... G10L 25/51 |
| 2014/0310001 A1* | 10/2014 | Kalns .................... G10L 15/30 |
| | | 704/270.1 |

(Continued)

FOREIGN PATENT DOCUMENTS

| | | |
|---|---|---|
| AU | 2003200674 B2 | 6/2007 |
| WO | 2016054230 A1 | 4/2016 |

OTHER PUBLICATIONS

"Can I use Siri During a phone call?", Posted on Apr. 3, 2014, 2 pages, <https://discussions.apple.com/thread/6058203>.

(Continued)

*Primary Examiner* — Daniel Abebe
(74) *Attorney, Agent, or Firm* — Erik Swanson; Andrew M. Calderon; Calderon Safran & Cole P.C.

(57) ABSTRACT

An indication associated with an AI mode enabled by an AI system is received from a user with an affirmative opt-in status. A first task request associated with the user is identified. One or more instructions associated with the first task request are contextually recognized. The first task request is completed based on the contextually recognized one or more instructions.

20 Claims, 4 Drawing Sheets

(56) References Cited

U.S. PATENT DOCUMENTS

| | | | |
|---|---|---|---|
| 2014/0343937 A1* | 11/2014 | Katis | H04L 51/10 |
| | | | 704/235 |
| 2021/0012766 A1* | 1/2021 | Kim | G10L 25/51 |
| 2021/0134270 A1* | 5/2021 | Rakshit | G06F 3/167 |
| 2021/0375286 A1* | 12/2021 | Choudhury | G10L 15/183 |
| 2021/0383794 A1* | 12/2021 | Kim | G06F 3/167 |

OTHER PUBLICATIONS

"Alexa, join my meeting"—Join conference calls with Alexa, now open to all Alexa users!, Apr. 4, 2019, 4 pages, <https://aws.amazon.com/blogs/business-productivity/alexa-join-my-meeting-join-conference-calls-with-alexa-now-open-to-all-alexa-users/>.

Brookes, Tim, "How to Use Your iPhone While on a Phone Call", Oct. 30, 2019, 6 pages, <https://www.howtogeek.com/444758/how-to-use-your-iphone-while on-a-phone-call/>.

Disclosed Anonymously, "System and Method to Recognize, Analyze and Action a Smart Phone Conversation", An IP.com Prior Art Database Technical Disclosure, IP.com No. IPCOM000248174D, IP.com Electronic Publication Date: Nov. 4, 2016, 5 pages.

* cited by examiner

ARTIFICIAL INTELLIGENCE SYSTEM FOR TASKS

BACKGROUND

The present invention relates generally to the field of artificial intelligence (AI) and more importantly to augmenting a digital assistant by using AI.

AI refers to the simulation of human intelligence in machines that are programmed to think like humans, mimic their actions, and execute their tasks (from the simplest to those that are far more complex). The term may also be applied to any machine that exhibits traits associated with a human mind such as learning and problem-solving. An ideal characteristic of AI is its ability to rationalize and take actions that have the best chance of achieving a specific goal. An AI-based computing device is defined as any device that perceives its environment and takes actions that maximize its chance of successfully achieving its goals.

SUMMARY OF THE INVENTION

Embodiments of the present invention include an approach for augmenting a digital assistant by using artificial intelligence. In one embodiment, an indication associated with an AI mode enabled by an AI system is received from a user with an affirmative opt-in status. A first task request associated with the user is identified. One or more instructions associated with the first task request are contextually recognized. The first task request is completed based on the contextually recognized one or more instructions.

DETAILED DESCRIPTION

Embodiments of the present invention recognize that people today seem to be always engaged. Whether talking on the phone, viewing social media, texting family and friends, or just 'surfing' the Internet, people are engaged, often with some sort of computing device such as, for example, a smartphone, smartwatch, tablet, or laptop computer. Being engaged in this manner may mean that information flowing at a rapid pace. For example, while on a group call with old college buddies you have not spoken with for several years a reminder pops up on your phone to schedule an oil change for your prized automobile. But you cannot stop now to make a note of the reminder because the conversation is too interesting. An artificial intelligence (AI) system is needed that can complete a spoken task (said task may be recognized by the AI system as part of the natural flow of the conversation or said task may be directed at the AI system by a speaker).

Embodiments of the present invention recognize that there may be a method, computer program product, and computer system for augmenting a digital assistant by using AI. In an embodiment, the augmented digital assistant is included in any number of computing devices (e.g., a smartwatch, a smartphone, a tablet computer, a laptop computer, a stand-alone digital assistant, a web browser, etc.). The augmented digital assistant improves the technology of several forms of communication (e.g., human-to-human phone calls and electronic conferences, person-to-person(s) visits, human-to-bot interactions, etc.) by automatically identifying a spoken task and either (i) acting on said task immediately (e.g., "change the temperature to 69° F.") or (ii) storing said task for later action (e.g., "remind me to take my medicine when the football game is over"). The spoken task can be identified (i.e., received) from a direct instruction to the AI system (e.g., "AI, buy movie tickets for 'The Movie' for Friday at 8:30.") and the AI system can identify on its own a task that needs to be performed (e.g., Joe talking on the phone to Bill—"Holy cow Bill, I need to get my snow tires off of my car!"; here, the AI system identifies a task and adds a reminder on Joe's calendar for the weekend as Joe is a home mechanic). According to an embodiment, the AI system is able to take immediate action on a task and provide a confirmation to the user associated with the task. According to another embodiment, the AI system is able to store a task request and complete said request at a later time (e.g., after an interaction between users is over). In an embodiment, the augmented digital assistant creates a user interface for a user to enter details associated with a task (e.g., time and date entry fields so that the user does not have to speak details for the task).

In an embodiment, communication is identified. In the embodiment, an opt-in status of participants is determined. Further in the embodiment, an indication is received. Further yet in the embodiment, a determination is made whether an interrupt mode is enabled. Further yet in the embodiment, in response to determining that interrupt mode is enabled, a request is received. Further yet in the embodiment, a determination is made whether a user associated with the request is a valid user. Further yet in the embodiment, in response to the user being a valid user, information is collected. Further yet in the embodiment, the request is completed. Further yet in the embodiment, a status is transmitted. Further yet in the embodiment, a determination is made whether the communication has ended. Further yet in the embodiment, in response to determining that the communication has ended, a program ends.

In another embodiment, in response to determining that an interrupt mode is not enabled (i.e., a non-interrupt mode is enabled instead), a determination is made that the non-interrupt mode remains enabled. In the embodiment, a first request is received. Further in the embodiment, a determination is made whether a user associated with the first request is a valid user. Further yet in the embodiment, in response to determining that the user associated with the first request is a valid user, information is collected. Further yet in the embodiment, the first request is stored. Further yet in the embodiment, a determination is made whether the communication has ended. Further yet in the embodiment, in response to determining that the communication has ended, a request list is transmitted to the valid user. Further yet in the embodiment, a confirmation is received. Further yet in the embodiment, the confirmed request(s) are completed. Further yet in the embodiment, a result of the completed request is transmitted to the valid user.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
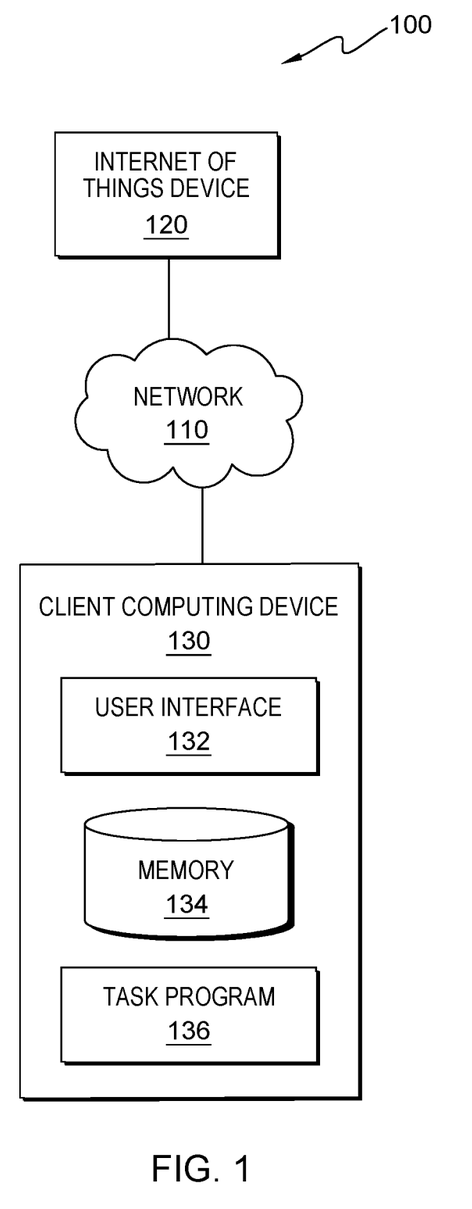
FIG. 1 depicts a functional block diagram illustrating a computing environment which includes a task program, in accordance with an embodiment of the present invention.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes Internet of things (IoT) device 120 and client computing device 130 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with IoT device 120 and client computing device 130 over network 110.

In embodiments of the present invention, IoT device 120 and client computing device 130 are connected to network 110, which enables IoT device 120 and client computing device 130 to access other computing devices and/or data not directly stored on IoT device 120 and client computing device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between IoT device 120 and client computing device 130, and any other computing devices (not shown in FIG. 1) connected to network 110, in accordance with embodiments of the present invention.

According to an embodiment, IoT device 120 is a computing device in a system of interrelated computing devices that are provided with unique identifiers (UIDs) and the ability to transmit and receive data over a network without requiring human-to-human or human-to-computer interaction. Application uses for IoT device 120 include, but are not limited to, business, consumer, commercial, industrial, infrastructure, and military applications. In an embodiment, IoT device 120 is a device used in a personal and general business setting. In the embodiment, examples of IoT device 120 include, but are not limited to, a stand-alone AI assistant and an embedded AI assistant. A stand-alone AI assistant is a small, always on device that sits on furniture or a desk, is hung on a wall, or worn on the clothing or the body while an embedded AI assistant is a built-in program stored to a memory of a computing device such as a smartphone, a smartwatch, and client computing device 130. According to an embodiment, IoT device 120 is any electronic device capable of listening to a conversation between any number of people, or between a person and a bot. In the embodiment, the primary function of IoT device 120 is to identify one or more task requests of a user and to complete said one or more task requests. In an embodiment, computing environment 100 includes any number of IoT device 120. IoT device 120 may include internal and external hardware components as depicted and described in further detail with respect to FIG. 3, in accordance with embodiments of the present invention.

According to an embodiment, client computing device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client computing device 130 can be a standalone computing device, a management server, a web server, a mobile computing device, or any other electronic device or computing system capable of receiving, transmitting, and processing data. In other embodiments, client computing device 130 can represent computing systems utilizing multiple computers as a server system, such as in a cloud computing environment. In certain embodiments, client computing device 130 represents a computer system utilizing clustered computers and components (e.g., database server computers, application server computers, etc.) that act as a single pool of seamless resources when accessed by elements of computing environment 100. In general, client computing device 130 is representative of any electronic device or combination of electronic devices capable of executing computer readable program instructions. According to one embodiment, client computing device 130 is a computing device for sharing a presentation via an electronic conference. In an embodiment, computing environment 100 includes any number of client computing device 130. Client computing device 130 may include internal and external hardware components as depicted and described in further detail with respect to FIG. 3, in accordance with embodiments of the present invention. In an embodiment, client computing device 130 also includes user interface (UI) 132, memory 134, and task program 136.

In an embodiment, UI 132 provides an interface between a user of client computing device 130, IoT device 120, task program 136, and any other programs and computing devices (not shown in FIG. 1) accessible via network 110. UI 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 132 may also be mobile application software that provides an interface between client computing device 130, IoT device 120, and task program 136. Mobile application software, or an "app," is a computer program designed to run on smartphones, tablet computers and other mobile devices. UI 132 enables a user of client computing device 130 to interact with IoT device 120, task program 136, any other programs and applications included on client computing device 130 (not shown in FIG. 1), and any other computing devices (not shown in FIG. 1).

According to an embodiment, memory 134 is storage that is written to and/or read by IoT device 120, client computing device 130, task program 136, and any other programs and applications on IoT device 120 and client computing device 130. In one embodiment, memory 134 resides on client computing device 130. In other embodiments, memory 134 resides on IoT device 120, on any other device (not shown in FIG. 1) in computing environment 100, in cloud storage, or on another computing device accessible via network 110. In yet another embodiment, memory 134 represents multiple storage devices within client computing device 130. Memory 134 may be implemented using any volatile or non-volatile storage media for storing information, as known in the art. For example, memory 134 may be implemented with a tape library, optical library, one or more independent hard disk drives, multiple hard disk drives in a redundant array of independent disks (RAID), solid-state drives (SSD), or random-access memory (RAM). Similarly, memory 134 may be implemented with any suitable storage architecture known in the art, such as a relational database, an object-oriented database, or one or more tables. In an embodiment of the present invention, IoT device 120, client computing device 130, task program 136, and any other programs and applications (not shown in FIG. 1) operating on client computing device 130 may store, read, modify, or write data to memory 134. In an embodiment of the present invention, data stored to memory 134 includes, but is not limited to, one or more task requests from a user to be completed and a listing of previously completed tasks.

In an embodiment of the present invention, task program 136 is a program, a subprogram of a larger program, an application, a plurality of applications, or mobile application software, which functions to augment a digital assistant by using artificial intelligence. A program is a sequence of instructions written to perform a specific task. In an embodiment, task program 136 runs independently. In other embodiments, task program 136 depends on system software and/or other programs (not shown in FIG. 1) to execute. According to an embodiment, task program 136 is a cognitive system based on AI utilizing machine learning and deep learning which receives or identifies one or more task requests from a user. In the embodiment, task program 136 completes the one or more task requests. In one embodiment, task program 136 functions as a stand-alone program residing on client computing device 130. In another embodiment, task program 136 works in conjunction with other programs, applications, etc., found in computing environment 100. In yet another embodiment, task program 136 resides on other computing devices in computing environment 100 such as IoT device 120, which is interconnected to client computing device 130 via network 110.

According to an embodiment, task program 136 identifies communication. In the embodiment, task program 136 determines an opt-in status of participants. Further in the embodiment, task program 136 receives an indication. Further in the embodiment, task program 136 determines whether an interrupt mode is enabled. Further in the embodiment, responsive to determining that an interrupt mode is enabled, task program 136 determines that the interrupt mode remains enabled (i.e., that a user has not opted to disable interrupt mode after initially enabling said mode). Further in the embodiment, task program 136 receives a request. Further in the embodiment, task program 136 determines whether a user associated with the request is a valid user. Further in the embodiment, responsive to determining that the user associated with the request is a valid user, task program 136 collect information. Further in the embodiment, task program 136 completes the request. Further in the embodiment, task program 136 transmits a status. Further in the embodiment, task program 136 determines whether the communication has ended. Further in the embodiment, responsive to determining that the communication has ended, task program 136 ends.

According to another embodiment, responsive to determining that an interrupt mode is not enabled (i.e., a non-interrupt mode is enabled), task program 136 determines that the non-interrupt mode remains enabled (i.e., that a user has not opted to disable non-interrupt mode after initially enabling said mode). Further in the embodiment, task program 136 receives a first request. Further in the embodiment, task program 136 determines whether a user associated with the first request is a valid user. Further in the embodiment, responsive to determining that the user associated with the first request is a valid user, task program 136 collects information. Further in the embodiment, task program 136 stores the first request. Further in the embodiment, task program 136 determines whether the communication has ended. Further in the embodiment, responsive to determining that the communication has ended, task program 136 transmits a request list to the valid user. Further in the embodiment, task program 136 receives a confirmation. Further in the embodiment, task program 136 completes the confirmed request(s). Further in the embodiment, task program 136 transmits a result of the completed request(s) to the valid user.

Figure 2:
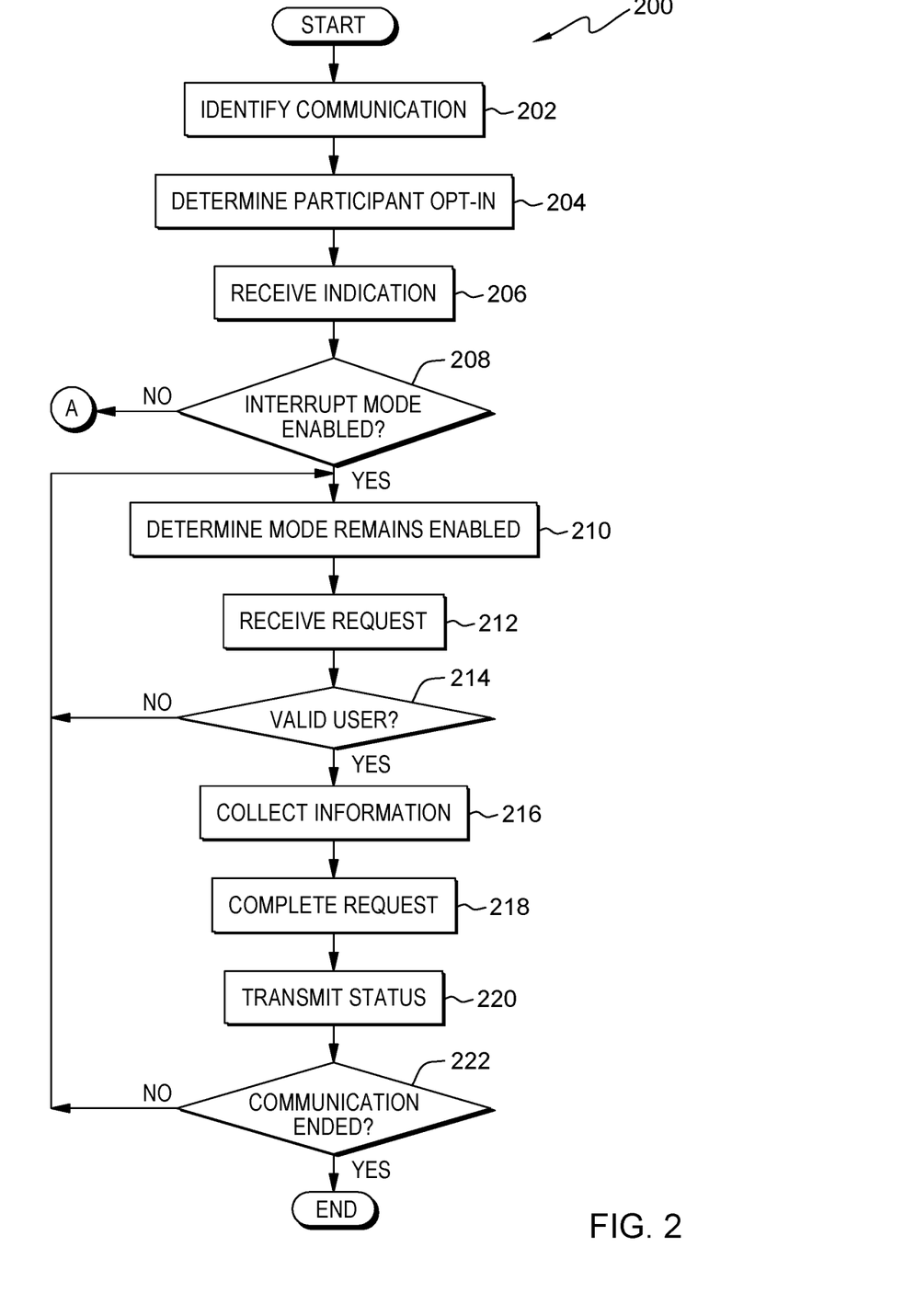
FIG. 2 is a flowchart depicting operational steps of a program for augmenting a digital assistant by using artificial intelligence, on a computing device within the computing environment of FIG. 1, in accordance with an embodiment of the present invention.

FIG. 2 is a flowchart of workflow 200 depicting operational steps for providing for the completion of tasks identified by an AI system. In one embodiment, the method of workflow 200 is performed by task program 136. In an alternative embodiment, the method of workflow 200 is performed by any other program in computing environment 100 working with task program 136. In an embodiment, a user of client computing device 130 invokes workflow 200 upon accessing task program 136. In another embodiment, workflow 200 and task program 136 is invoked by a user of IoT device 120. In yet another embodiment, workflow 200 is dynamically invoked upon a user of client computing device 130 making a phone call.

In an embodiment, task program 136 identifies communication (step 202). In other words, task program 136 identifies that a form of communication has taken place or is taking place. According to an embodiment, communication identified by task program 136 includes, but is not limited to, a person talking out loud to themselves or to an artificial intelligence (AI) device, a person talking to one or more other people, a person participating in a phone call with a bot (i.e., a software application that runs automated tasks over a network), a person participating in a phone call with one or more other people, and a person participating in an electronic meeting with one or more other people. The communication is identified by task program 136 by speech recognition, speech-to-text technology, natural language processing, or any other technology known in the art for identifying communication. In an embodiment, task program 136 identifies communication on network 110 between two users utilizing two different instances of client computing device 130. For example, a task program on Bill's smartphone identifies a phone call initiated by Bill which is made to his buddy Ted.

According to an embodiment of the present invention, task program 136 determines participant opt-in (step 204). In other words, task program 136 determines which of the participants in the identified communication have opted-in to using task program 136 (i.e., have an affirmative opt-in status). In an embodiment, task program 136 may utilize various accessible data sources that may include personal data, content, or information the one or more users wish not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Opting—in to use task program 136 enables the authorized and secure processing of personal data. Task program 136 provides informed consent, with notice of the collection of personal data, allowing the one or more users to opt-in or opt-out of processing personal data. Consent can take several forms. Opt—in consent can impose on a user to take an affirmative action before personal data is processed. Alternatively, opt-out consent can impose on the user to take an affirmative action to prevent the processing of personal data before personal data is processed. Task program 136 provides information regarding personal data and the nature (e.g., type, scope, purpose, duration, etc.) of the processing. Task program 136 provides the one or more users with copies of stored personal data. Further, task program 136 allows for the correction or completion of incorrect or incomplete personal data and also allows for the immediate deletion of personal data. According to an embodiment, task program 136 on client computing device 130 determines participant opt-ins for the two users of the two instances of client computing device 130 who are participating in the identified communication over network 110. For example, a task program on Bill's smartphone determines that Bill has opted-in to use said task program; the task program further determines that Ted has not opted-in.

In an embodiment, task program 136 receives indication (step 206). In other words, task program 136 receives an indication of an enabled AI mode from at least one opted-in participant. According to an embodiment, task program 136 receives an indication for one of an interrupt mode or a non-interrupt mode being enabled. According to the embodiment, task program 136 may also receive no indication meaning that neither mode is enabled. Interrupt mode (i.e., interrupt AI mode) is a mode where the AI completes the requested task during the identified communication; thus, interrupting said communication. Non-interrupt mode (i.e., non-interrupt AI mode) is a mode where the AI defers completing the requested task(s) until after the identified communication has ended; thus, there is no interruption during said communication. The indication may be provided by a user speaking a command (e.g., "Enable AI in non-interrupt mode") or by a user utilizing a combination of augmented reality glasses and one or more appropriate gestures (e.g., interrupt mode AI will be enabled if the user gives a 'thumbs up' signal). Each participant in the identified communication that has opted-in is able to provide an indication for a respective digital assistant associated with each participant (i.e., a first participant is associated with a first digital assistant, a second participant is associated with a second digital assistant, etc.). Since each digital assistant is associated with a specific participant, a particular digital assistant only receives task requests from the participant said digital assistant is associated with and who provides the indication of interrupt or non-interrupt mode for that digital assistant. In an embodiment, task program 136 on client computing device 130 receives an indication of an enabled AI mode from an opted-in participant of the identified communication. For example, the task program on Bill's smartphone receives an indication from Bill of an AI enabled mode.

According to an embodiment, task program 136 determines whether an interrupt mode is enabled (decision step 208). In other words, task program 136 determines whether an interrupt mode is enabled by an opted-in participant of the identified communication. In an embodiment, the determination is made by task program 136 based on the received indication from said participant. In one embodiment (decision step 208, NO branch), task program 136 determines that an interrupt mode is not enabled; therefore, task program 136 proceeds to step 224 to determine if another mode (e.g., a non-interrupt mode) remains enabled. In the embodiment (decision step 208, YES branch), task program 136 determines that an interrupt mode is enabled; therefore, task program 136 proceeds to step 210 to determine that the interrupt mode remains enabled.

In an embodiment, task program 136 determines mode remains enabled (step 210). In other words, task program 136 determines that the interrupt mode remains enabled. According to an embodiment, task program 136 requires the determination because the opted-in participant is able to disable (i.e., turn off) an enabled interrupt mode at any time during the identified communication. The determination is made by task program 136 based on an input from the opted-in participant (e.g., "Turn off interrupt mode."). If the interrupt mode is disabled, task program 136 ends. In an embodiment, task program 136 on client computing device 130 determines that interrupt mode remains enabled during the identified communication between the two users of the two instances of client computing device 130. For example, the task program on Bill's smartphone determines that Bill has not disabled the interrupt mode of the AI.

According to an embodiment of the present invention, task program 136 receives request (step 212). In other words, task program 136 receives or identifies a task request from a participant of the identified communication. In an embodiment, the task request received by task program 136 may be a direct task request (e.g., "AI, remind me to call Mom tonight at 6 PM."). The task request identified by task program 136 is an indirect task request (e.g., a husband says to his wife "I need to call my Mom after supper today."). Task program 136 uses contextual recognition, speech recognition, speech-to-text technology, natural language processing (NLP), and other technologies known in the art to receive or identify the task request, including one or more instructions associated with the task request. Examples of task requests received by task program 136 include, but are not limited to, setting up a reminder for a user (e.g., reminding the user to call Mom after dinner), updating a calendar of a user (e.g., adding a nephew's birthday to the user's calendar), requesting an appointment for the user (e.g., completing an online form to create an appointment for an oil change for the user's car), reserving an item for a user (e.g., reserving a conference room for the user), and the like. According to an embodiment, task program 136 on client computing device 130 receives a task request over network 110 from a user associated with an instance of client computing device 130. For example, the task program on Bill's smartphone receives a task request from Bill; the task request is an indirect task request that occurs during the identified communication between Bill and Ted—"You know Ted, I really need to call Chad this weekend to catch up".

In an embodiment, task program 136 determines valid user (decision step 214). In other words, task program 136 determines whether the task request is received from a valid user. According to an embodiment, a valid user is a first user that is opted-in and has provided the indication of an enabled AI mode (e.g., if user 'A', 'B', and 'C' have all opted-in and user 'A' has provided an indication of an enabled AI mode, user 'A' is the only valid user of the indicated enabled AI mode amongst the three users). Each user can be a valid user for their respective enabled AI modes, but each enabled AI only recognizes task requests from the associated user who enabled said AI based on speech recognition technology authorized during installation and/or set-up of the AI. For example, consider Bill calling Bob on the phone. Both Bill and Bob are opted-in and both individually enable an AI mode. During the call, Bill makes a remark about needing to call Jill after dinner. Bob comments during the call with Bill that he needs to remind Ralph about their tennis match on Saturday. In the example, the AI mode associated with Bill adds an alarm on a calendar associated with Bill for 6:00 PM that day with a message to call Jill (the AI mode associated with Bob takes no action regarding the reminder to call Jill). Further in the example, the AI mode associated with Bob creates a text message for Bob and transmits said text message to Ralph reminding Ralph of the tennis match on Saturday (the AI mode associated with Bill takes no action regarding the tennis match between Bob and Ralph). In an embodiment (decision step 214, NO branch), task program 136 determines that the user associated with the received task request is not a valid user; therefore, task program 136 returns to step 210 to determine if interrupt mode remains enabled. In the embodiment (decision step 214, YES branch), task program 136 determines that the user associated with the received task request is a valid user; therefore, task program 136 proceeds to step 216 to collect information.

According to an embodiment, task program 136 collects information (step 216). In other words, responsive to determining that the task request is received from a valid user, task program 136 collects information associated with the received task request and the valid user. In an embodiment, task program 136 collects information such as a current date, a future date associated with the task request, one or more names associated with the task request, information associated with the valid user (e.g., contacts included in a contact list of the user, a calendar (and associated entries) of the user, applications included on a computing device of the user, secure application programming interfaces associated with the user, etc.), and the like. Task program 136 stores the collected information associated with the task request and the valid user to a temporary or a permanent memory. According to an embodiment, task program 136 on client computing device 130 collects information associated with the task request received from the instance of client computing device 130 associated with the valid user. For example, the task program on Bill's smartphone collects information associated with Bill and the task request (i.e., "call Chad this weekend").

In an embodiment, task program 136 completes request (step 218). In other words, task program 136 completes the task request received from the valid user. According to an embodiment, task program 136 completes the task request based on the collected information. The task request is completed by task program 136 (i) as soon as the necessary information is collected or (ii) at any time prior to the end of the communication (e.g., the valid user may request a task be completed after ten minutes have passed to allow time for another user to update certain information that affects said task request). In an embodiment, task program 136 on client computing device 130 completes the task request from the valid user associated with the instance of client computing device 130. For example, the task program on Bill's smartphone adds a reminder to a calendar included on said smartphone; the reminder is set for noon on Saturday and reads "Call Chad this weekend".

In yet another embodiment, task program 136 receives the indication of the enabled AI mode from the at least one opted-in user. In response to identifying (i.e., receiving) a task request from the at least one opted-in user, task program 136 identifies a context (i.e., contextually recognizes instructions) associated with the task request. The instructions are contextually recognized by task program 136 by determining whether the at least one opted-in user is a valid user and in response to determining a valid user, collecting information associated with the valid user and the task request. Based on the collected information, task program 136 completes the task request of the valid user.

According to an embodiment of the present invention, task program 136 transmits status (step 220). In other words, task program 136 transmits a status of the completed task request associated with the valid user. In an embodiment, task program 136 transmits the status using any technology known in the art (e.g., a text message, a pop-up message, an audible message, an e-mail, etc.). The transmitted status informs the valid user that either (i) the task request was successfully completed or (ii) the task request could not be completed because of the following one or more reasons included in the transmitted status. According to an embodiment, task program 136 on client computing device 130 transmits a status associated with the task request to the valid user associated with an instance of client computing device 130. For example, the task program on Bill's smartphone transmits a pop-up message to said smartphone; the pop-up message reads "A calendar reminder to call Chad has been added to your calendar for noon on Saturday".

In an embodiment of the present invention, task program 136 determines whether communication has ended (decision step 222). In other words, task program 136 determines whether the identified communication such as a person taking out loud to themselves or to an AI device, a person talking to one or more other people, a person participating in a phone call with a bot, a person participating in a phone call with one or more other people, and a person participating in an electronic meeting with one or more other people has ended. According to an embodiment, task program 136 makes the determination based on a farewell spoken by the valid user, by a connection ending, by a computing device associated with the identified communication being powered off, by a lack of sound, or by any other means known in the art. In an embodiment (decision step 222, NO branch), task program 136 determines that the identified communication has not ended; therefore, task program 136 returns to step 210 to determine if interrupt mode remains enabled. In the embodiment (decision step 222, YES branch), task program 136 determines that the identified communication has ended; therefore, task program 136 ends.

According to an embodiment of the present invention, task program 136 determines mode remains enabled (step 224). In other words, responsive to determining that an interrupt mode is not enabled (i.e., a non-interrupt mode is enabled), task program 136 determines that the non-interrupt mode remains enabled (i.e., that a user has not disabled the non-interrupt mode after initially enabling said mode). In an embodiment, task program 136 requires the determination because the opted-in participant is able to disable (i.e., turn off) an enabled non-interrupt mode at any time during the identified communication. The determination is made by task program 136 based on an input from the opted-in participant (e.g., "Turn off non-interrupt mode."). If the non-interrupt mode is disabled, task program 136 ends. In an embodiment, task program 136 on client computing device 130 determines that non-interrupt mode remains enabled during the identified communication between two users of two instances of client computing device 130. For example, the task program on Bill's smartphone determines that Bill has not disabled the non-interrupt mode of the AI.

In an embodiment of the present invention, task program 136 receives request (step 226). In other words, task program 136 receives one or more task requests from a participant of the identified communication. According to an embodiment, the one or more task requests received by task program 136 may be a direct task request (e.g., "AI, remind me to call Mom tonight at 6 PM.") or an indirect task request (e.g., a husband says to his wife "I need to call my Mom after supper today."). Task program 136 uses speech recognition, speech-to-text technology, natural language processing (NLP), and other technologies known in the art to receive the one or more task requests. Examples of task requests received by task program 136 include, but are not limited to, setting up a reminder for a user (e.g., reminding the user to call Mom after dinner), updating a calendar of a user (e.g., adding a nephew's birthday to the user's calendar), requesting an appointment for the user (e.g., completing an online form to create an appointment for an oil change for the user's car), reserving an item for a user (e.g., reserving a conference room for the user), and the like. According to an embodiment, task program 136 on client computing device 130 receives one or more task requests over network 110 from a user associated with an instance of client computing device 130. For example, the task program on Bill's smartphone receives a first task request from Bill; the first task request is a direct task request that occurs during the identified communication between Bill and Ted— "AI, set a timer for 90 minutes from now so I remember to turn off the sprinkler"; this task request by Bill was stated at a current time of 11:00 AM. Later in the same call, the task program on Bill's smartphone receives a second task request from Bill; the second task request is an indirect task request— during their call, Bill mentions the following to Ted— "I should really call my dentist today to check on this tooth sometime next week since I'm on vacation".

According to an embodiment of the present invention, task program 136 determines valid user (decision step 228). In other words, task program 136 determines whether a user associated with the one or more task requests is a valid user. In an embodiment, a valid user is a user that is opted-in and is the same user that has provided the indication of an enabled AI mode (e.g., if user 'A', 'B', and 'C' have all opted-in and user 'A' has provided an indication of an enabled AI mode, user 'A' is the only valid user amongst the three users). In an embodiment (decision step 228, NO branch), task program 136 determines that the user associated with the received one or more task requests is not a valid user; therefore, task program 136 returns to step 224 to determine if non-interrupt mode remains enabled. In the embodiment (decision step 228, YES branch), task program 136 determines that the user associated with the received one or more task requests is a valid user; therefore, task program 136 proceeds to step 230 to collect information.

In an embodiment of the present invention, task program 136 collects information (step 230). In other words, responsive to determining that the one or more task requests are received from a valid user, task program 136 collects information associated with the received one or more task requests. In an embodiment, task program 136 collects information such as a current date, one or more future dates associated with the one or more task requests, one or more names associated with the one or more task requests, information associated with the valid user (e.g., contacts included in a contact list of the user, a calendar (and associated entries) of the user, applications included on a computing device of the user, secure application programming interfaces associated with the user, etc.), and the like. According to an embodiment, task program 136 on client computing device 130 collects information associated with the one or more task requests received from the instance of client computing device 130 associated with the valid user. For example, the task program on Bill's smartphone collects information associated with Bill and the two task requests (i.e., (i) the sprinkler reminder and (ii) making the dentist appointment).

According to an embodiment of the present invention, task program 136 stores request (step 232). In other words, task program 136 stores the one or more task requests and the collected information associated with the one or more task requests (i.e., the 'information') to an available memory. In an embodiment, task program 136 stores the 'information' to a local memory (e.g., memory 134 on client computing device 130), to a remote memory (e.g., to a database in a private cloud accessible via network 110), or to any other memory accessible by task program 136 via network 110. According to an embodiment, task program 136 on client computing device 130 stores the one or more task requests ant the collected information associated with the one or more task requests to memory 134 on client computing device 130. For example, the task program on Bill's smartphone stores the two task requests, and the collected information associated with the two task requests, to a memory included on the smartphone.

In an embodiment of the present invention, task program 136 determines whether communication has ended (decision step 234). In other words, task program 136 determines whether the identified communication such as a person taking out loud to themselves or to an AI device, a person talking to one or more other people, a person participating in a phone call with a bot, a person participating in a phone call with one or more other people, and a person participating in an electronic meeting with one or more other people has ended. According to an embodiment, task program 136 makes the determination based on a farewell spoken by the valid user, by a connection ending, by a computing device associated with the identified communication being powered off, by a lack of sound, or by any other means known in the art. In an embodiment (decision step 234, NO branch), task program 136 determines that the identified communication has not ended; therefore, task program 136 returns to step 224 to determine if non-interrupt mode remains enabled. In the embodiment (decision step 234, YES branch), task program 136 determines that the identified communication has ended; therefore, task program 136 proceeds to step 236 to transmit a request list.

According to an embodiment of the present invention, task program 136 transmits request list (step 236). In other words, task program 136 transmits a list to the valid user which includes the one or more task requests associated with the valid user. In an embodiment, task program 136 retrieves the stored task request(s) and compiles the list to be transmitted. Task program 136 uses any technology known in the art (e.g., a text message, an e-mail, a pop-up message, an audible message, etc.) to transmit the list of one or more task requests to the valid user. According to an embodiment, task program 136 on client computing device 130 transmits a request list of the one or more task requests to the instance of client computing device 130 associated with the valid user. For example, the task program on Bill's smartphone presents a pop-up message on the smartphone user interface which displays the two task requests received during the completed phone call between Bill and Ted.

In an embodiment of the present invention, task program 136 receives confirmation (step 238). In other words, task program 136 receives a confirmation from the valid user which includes an indication from said user whether or not to perform the one or more task requests. According to an embodiment, the confirmation received by task program 136 includes one of (i) an indication to complete each of the one or more task requests; (ii) an indication to complete none of the one or more task requests; and (iii) an indication to complete specific task requests (but not all of the task requests) included in the one or more task requests. The confirmation received by task program 136 is received via any technology known in the art (e.g., an audible confirmation, an indication via an available user interface, etc.). In an embodiment, task program 136 on client computing device 130 receives a confirmation via network 110 from the instance of client computing device 130 associated with the valid user. For example, the task program on Bill's smartphone receives a confirmation from Bill; the received confirmation includes a first indication to complete the reminder task request concerning turning off the sprinkler and a second indication to ignore the dentist task request as Bill realized he already had an appointment for his six month routing teeth cleaning.

According to an embodiment of the present invention, task program 136 completes confirmed request (step 240). In other words, task program 136 completes the one or more task requests associated with the valid user according to the indications included in the received confirmation. In an embodiment, (i) all of the one or more task requests are completed by task program 136; (ii) none of the one or more task requests are completed task program 136; or (iii) some portion of the one or more task requests are completed task program 136. The one or more task requests are completed by task program 136 based on the specific task and the associated collected information that has been stored to a memory. According to an embodiment, task program 136 on client computing device 130 completes the one or more task requests received from the instance of client computing device 130 associated with the valid user. For example, the task program on Bill's smartphone sets a timer to ring at the time of 12:30 PM (which is 90 minutes after the time of 11:00 AM when Bill stated the task request). However, the task program does not perform any action regarding the dentist appointment as Bill provided an indication in the received confirmation that said task request should be ignored.

In an embodiment of the present invention, task program 136 transmits request result (step 242). In other words, task program 136 transmits a result of each of the one or more task requests to the valid user. According to an embodiment, task program 136 uses any technology known in the art for transmitting the request results of the one or more task requests. Examples of technology include, but are not limited to, an e-mail, a pop-up message, a text message, an audible message, and the like. The transmitted request result may be sent immediately upon completion of one or more of the one or more task requests or said request result may be sent at a specified day and time. In an embodiment, task program 136 on client computing device 130 transmits a result of each of the one or more task requests to the instance of client computing device 130 associated with the valid user. For example, the task program on Bill's smartphone transmits a text message to said smartphone showing that (i) a timer was set to go off at 12:30 PM and (ii) the task request associated with Bill's dentist was ignored.

Figure 3:
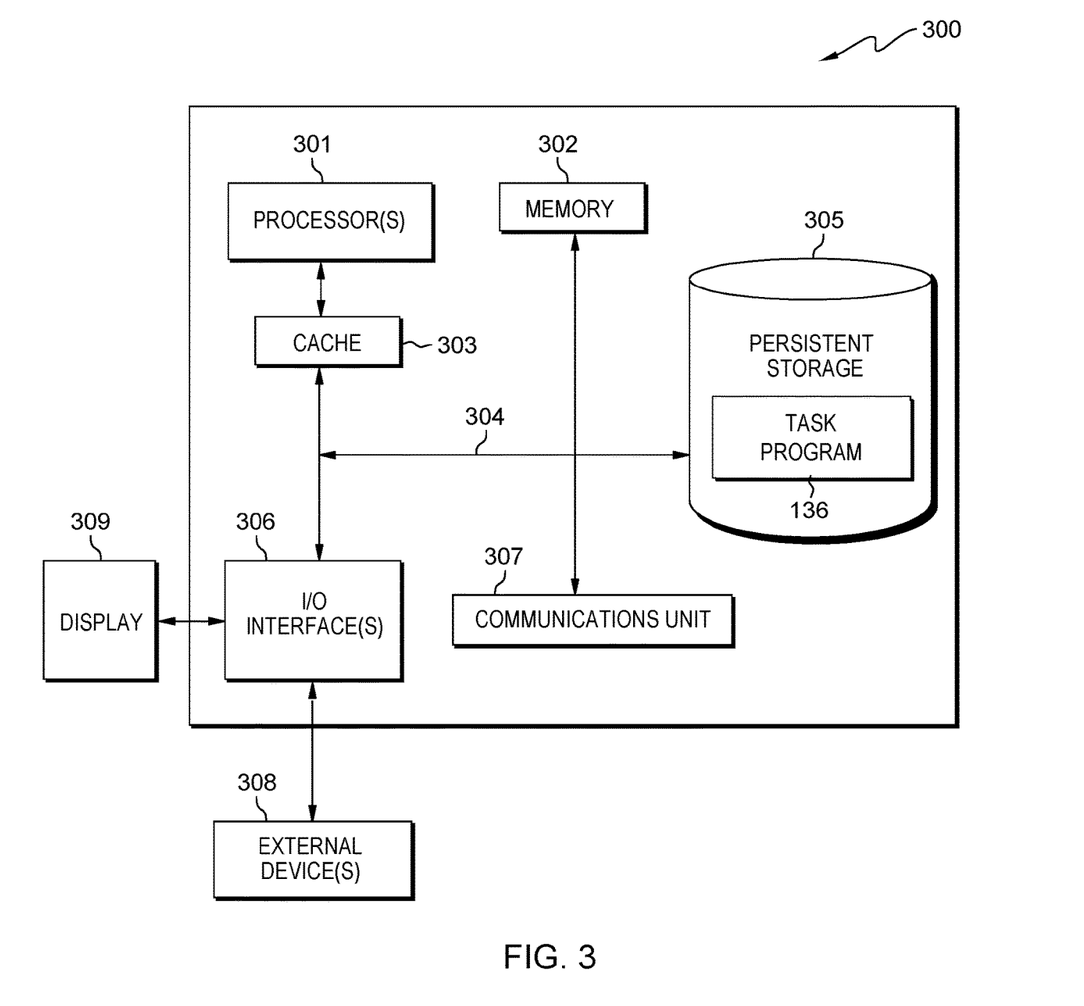
FIG. 3 depicts a block diagram of components of a computing device executing a task program within the computing environment of FIG. 1, in accordance with an embodiment of the present invention.

FIG. 3 depicts computer system 300, which is an example of a system that includes task program 136. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   receiving, by an artificial intelligence (AI) system comprising one or more computer processors, an indication associated with an AI mode enabled by the AI system from a user with an affirmative opt-in status, wherein the AI mode is enabled by the user selecting one of an interrupt AI mode and a non-interrupt mode;
   identifying, by an AI system comprising one or more computer processors, a first task request associated with the user;
   contextually recognizing, by an AI system comprising one or more computer processors, one or more instructions associated with the first task request; and
   completing, by an AI system comprising one or more computer processors, the first task request based on the contextually recognized one or more instructions.

2. The method of claim 1, wherein the step of contextually recognizing, by an AI system comprising one or more computer processors, one or more instructions associated with the first task request, comprises:
   determining, by an AI system comprising one or more computer processors, whether the user with the affirmative opt-in status is a valid user; and
   responsive to determining that the user with the affirmative opt-in status is a valid user, collecting, by an AI system comprising one or more computer processors, information associated with the valid user and the first task request.

3. The method of claim 1, further comprising:
   identifying, by an AI system comprising one or more computer processors, a communication taking place, wherein:
   the communication is occurring between at least one of (i) a person and an AI device and (ii) between two or more people; and
   the communication is identified via at least one of context recognition, speech recognition, speech-to-text technology, and natural language processing;
   determining, by an AI system comprising one or more computer processors, an opt-in status of the person or each of the two or more people;
   determining, by an AI system comprising one or more computer processors, whether the AI mode is the interrupt AI mode or the non-interrupt mode based on the received indication associated with the AI mode; and
   determining, by an AI system comprising one or more computer processors, that the AI mode is the interrupt AI mode.

4. The method of claim 3, further comprising:
   responsive to determining that the AI mode is the non-interrupt mode, identifying, by an AI system comprising one or more computer processors, one or more task requests associated with the user, wherein the one or more task requests are identified through contextual recognition of one or more instructions made by the user;
   determining, by an AI system comprising one or more computer processors, whether the one or more task requests are received from a valid user;
   responsive to determining that the one or more task requests are received from a valid user, collecting, by an AI system comprising one or more computer processors, information associated with the valid user and the one or more task requests;
   storing, by an AI system comprising one or more computer processors, the one or more task requests and the collected information;
   responsive to determining that the communication has ended, transmitting, by an AI system comprising one or more computer processors, a request list to the valid user, wherein the request list comprises the one or more task requests;
   receiving, by an AI system comprising one or more computer processors, a confirmation from the valid user to complete at least one task request of the one or more task requests included in the transmitted request list;
   completing, by an AI system comprising one or more computer processors, the at least one task request; and
   transmitting, by an AI system comprising one or more computer processors, to the valid user a result associated with the completed at least one task request.

5. The method of claim 3, wherein:
   the interrupt AI mode completes the first task request during the communication; and
   the non-interrupt AI mode completes the one or more task requests after the communication has ended.

6. The method of claim 2, wherein the information associated with the valid user and the first task request comprises a current date, a future date associated with the first task request, one or more names associated with the first task request, one or more contacts included in a contact list of the valid user, a calendar and associated calendar entries of the valid user, one or more applications included on a computing device of the valid user, and one or more secure application programming interfaces associated with the user.

7. The method of claim 1, further comprising:
   transmitting, by an AI system comprising one or more computer processors, a status of the completed first task;
   responsive to determining that the communication has not ended, determining, by an AI system comprising one or more computer processors, that the interrupt AI mode remains enabled;
   responsive to determining that the interrupt AI mode remains enabled, identifying, by an AI system comprising one or more computer processors, one or more task requests associated with the user, wherein the one or more task requests are identified through contextual recognition of one or more instructions made by the user;
   determining, by an AI system comprising one or more computer processors, whether the one or more task requests are received from a valid user;
   responsive to determining that the one or more task requests are received from a valid user, collecting, by an AI system comprising one or more computer processors, information associated with the valid user and the one or more task requests;

storing, by an AI system comprising one or more computer processors, the one or more task requests and the collected information;

responsive to determining that the communication has ended, transmitting, by an AI system comprising one or more computer processors, a request list to the valid user, wherein the request list comprises the one or more task request;

receiving, by an AI system comprising one or more computer processors, a confirmation from the valid user to complete at least one task request of the one or more task requests included in the transmitted request list;

completing, by an AI system comprising one or more computer processors, the at least one task request; and transmitting, by an AI system comprising one or more computer processors, to the valid user a result associated with the completed at least one task request.

8. A computer program product, the computer program product comprising:
one or more computer readable storage media; and
program instructions stored on the one or more computer readable storage media, the program instructions comprising:
program instructions to receive an indication associated with an AI mode enabled by the AI system from a user with an affirmative opt-in status, wherein the AI mode is enabled by the user selecting from one of an interrupt AI mode and a non-interrupt mode;
program instructions to identify a first task request associated with the user;
program instructions to contextually recognize one or more instructions associated with the first task request; and
program instructions to complete the first task request based on the contextually recognized one or more instructions.

9. The computer program product of claim 8, wherein the program instructions to contextually recognize one or more instructions associated with the first task request, comprise:
program instructions to determine whether the user with the affirmative opt-in status is a valid user; and
responsive to determining that the user with the affirmative opt-in status is a valid user, program instructions to collect information associated with the valid user and the first task request.

10. The computer program product of claim 8, further comprising program instructions stored on the one or more computer readable storage media, to:
identify a communication taking place, wherein:
the communication is occurring between at least one of (i) a person and an AI device and (ii) between two or more people; and
communication is identified via at least one of context recognition, speech recognition, speech-to-text technology, and natural language processing;
determine an opt-in status of the person or each of the two or more people;
determine whether the AI mode is the interrupt AI mode or the non-interrupt mode based on the received indication associated with the AI mode; and
determine that the AI mode is the interrupt AI mode.

11. The computer program product of claim 10, further comprising program instructions stored on the one or more computer readable storage media, to:
responsive to determining that the AI mode is the non-interrupt mode, identify one or more task requests associated with the user, wherein the one or more task requests are identified through contextual recognition of one or more instructions made by the user;
determine whether the one or more task requests are received from a valid user;
responsive to determining that the one or more task requests are received from a valid user, collect information associated with the valid user and the one or more task requests;
store the one or more task requests and the collected information;
responsive to determining that the communication has ended, transmit a request list to the valid user, wherein the request list comprises the one or more task requests;
receive a confirmation from the valid user to complete at least one task request of the one or more task requests included in the transmitted request list;
complete the at least one task request; and
transmit to the valid user a result associated with the completed at least one task request.

12. The computer program product of claim 10, wherein:
the interrupt AI mode completes the first task request during the communication; and
the non-interrupt AI mode completes the one or more task requests after the communication has ended.

13. The computer program product of claim 9, wherein the information associated with the valid user and the first task request comprises a current date, a future date associated with the first task request, one or more names associated with the first task request, one or more contacts included in a contact list of the valid user, a calendar and associated calendar entries of the valid user, one or more applications included on a computing device of the valid user, and one or more secure application programming interfaces associated with the user.

14. The computer program product of claim 8, further comprising program instructions stored on the one or more computer readable storage media, to:
transmit a status of the completed first task;
responsive to determining that the communication has not ended, determine that the interrupt AI mode remains enabled;
responsive to determining that the interrupt AI mode remains enabled, identifying, by an AI system comprising one or more computer processors, one or more task requests associated with the user, wherein the one or more task requests are identified through contextual recognition of one or more instructions made by the user;
determining, by an AI system comprising one or more computer processors, whether the one or more task requests are received from a valid user;
responsive to determining that the one or more task requests are received from a valid user, collecting, by an AI system comprising one or more computer processors, information associated with the valid user and the one or more task requests;
storing, by an AI system comprising one or more computer processors, the one or more task requests and the collected information;
responsive to determining that the communication has ended, transmitting, by an AI system comprising one or more computer processors, a request list to the valid user, wherein the request list comprises the one or more task request;
receiving, by an AI system comprising one or more computer processors, a confirmation from the valid user to complete at least one task request of the one or more task requests included in the transmitted request list;

completing, by an AI system comprising one or more computer processors, the at least one task request; and transmitting, by an AI system comprising one or more computer processors, to the valid user a result associated with the completed at least one task request.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to receive an indication associated with an AI mode enabled by the AI system from a user with an affirmative opt-in status, wherein the AI mode is enabled by the user selecting from one of an interrupt AI mode and a non-interrupt mode;
program instructions to identify a first task request associated with the user;
program instructions to contextually recognize one or more instructions associated with the first task request; and
program instructions to complete the first task request based on the contextually recognized one or more instructions.

16. The computer system of claim 15, wherein the program instructions to contextually recognize one or more instructions associated with the first task request, comprise:
program instructions to determine whether the user with the affirmative opt-in status is a valid user; and
responsive to determining that the user with the affirmative opt-in status is a valid user, program instructions to collect information associated with the valid user and the first task request.

17. The computer system of claim 15, further comprising program instructions stored on the one or more computer readable storage media for execution by at least one of the one or more computer processors, to:
identify a communication taking place, wherein:
the communication is occurring between at least one of (i) a person and an AI device and (ii) between two or more people; and
the communication is identified via at least one of context recognition, speech recognition, speech-to-text technology, and natural language processing;
determine an opt-in status of the person or each of the two or more people;
determine whether the AI mode is the interrupt AI mode or the non-interrupt mode based on the received indication associated with the AI mode; and
determine that the AI mode is the interrupt AI mode.

18. The computer system of claim 17, further comprising program instructions stored on the one or more computer readable storage media for execution by at least one of the one or more computer processors, to:
responsive to determining that the AI mode is the non-interrupt mode, identify one or more task requests associated with the user, wherein the one or more task requests are identified through contextual recognition of one or more instructions made by the user;
determine whether the one or more task requests are received from a valid user;
responsive to determining that the one or more task requests are received from a valid user, collect information associated with the valid user and the one or more task requests;
store the one or more task requests and the collected information;
responsive to determining that the communication has ended, transmit a request list to the valid user, wherein the request list comprises the one or more task requests;
receive a confirmation from the valid user to complete at least one task request of the one or more task requests included in the transmitted request list;
complete the at least one task request; and
transmit to the valid user a result associated with the completed at least one task request.

19. The computer system of claim 17, wherein:
the interrupt AI mode completes the first task request during the communication; and
the non-interrupt AI mode completes the one or more task requests after the communication has ended.

20. The computer system of claim 16, wherein the information associated with the valid user and the first task request comprises a current date, a future date associated with the first task request, one or more names associated with the first task request, one or more contacts included in a contact list of the valid user, a calendar and associated calendar entries of the valid user, one or more applications included on a computing device of the valid user, and one or more secure application programming interfaces associated with the user.

* * * * *